(12) United States Patent
Hamada et al.

(10) Patent No.: US 9,203,251 B2
(45) Date of Patent: Dec. 1, 2015

(54) BATTERY CHARGER

(71) Applicant: NISSAN MOTOR CO., LTD., Kanagawa (JP)

(72) Inventors: Mitsuharu Hamada, Zama (JP); Tatsuharu Taima, Isehara (JP); Hideyuki Yanase, Hiratsuka (JP); Yoshiaki Yano, Nishinomiya (JP)

(73) Assignee: NISSAN MOTOR CO., LTD., Yokohama-shi, Kanagawa (JP)

( * ) Notice: Subject to any disclaimer, the term of this patent is extended or adjusted under 35 U.S.C. 154(b) by 125 days.

(21) Appl. No.: 14/349,611

(22) PCT Filed: Sep. 19, 2012

(86) PCT No.: PCT/JP2012/073924
§ 371 (c)(1),
(2) Date: Apr. 3, 2014

(87) PCT Pub. No.: WO2013/051391
PCT Pub. Date: Apr. 11, 2013

(65) Prior Publication Data
US 2014/0239887 A1     Aug. 28, 2014

(30) Foreign Application Priority Data

Oct. 7, 2011 (JP) .................................. 2011-223284

(51) Int. Cl.
*H02J 7/00* (2006.01)
*H01M 10/44* (2006.01)
(Continued)

(52) U.S. Cl.
CPC ........... *H02J 7/0042* (2013.01); *B60L 11/1825* (2013.01); *B60L 11/1874* (2013.01); *H01M 10/44* (2013.01); *H02J 7/02* (2013.01); *Y02T 10/705* (2013.01); *Y02T 10/7005* (2013.01); *Y02T 90/121* (2013.01); *Y02T 90/128* (2013.01); *Y02T 90/14* (2013.01)

(58) Field of Classification Search
CPC ....... H02J 7/0042; H02J 7/02; B60L 11/1874; B60L 11/1825; H01M 10/44; Y02T 90/121; Y02T 10/7005; Y02T 90/128; Y02T 90/14; Y02T 10/705
See application file for complete search history.

(56) References Cited

U.S. PATENT DOCUMENTS

| 2001/0003414 A1* | 6/2001 | Kajiura | ................. B60L 11/182 320/108 |
| 2001/0003416 A1* | 6/2001 | Kajiura | ............... B60L 11/1825 320/109 |
| 2001/0004201 A1 | 6/2001 | Kajiura | |

(Continued)

FOREIGN PATENT DOCUMENTS

| JP | 11266509 A | 9/1999 |
| JP | 2001178001 A | 6/2001 |

(Continued)

*Primary Examiner* — Nha Nguyen
(74) *Attorney, Agent, or Firm* — Young Basile

(57) ABSTRACT

A battery charger on which power conversion components for converting commercial power to direct current power are mounted, includes a core frame formed into a C-letter shape in horizontal cross section. The components at least producing heat among the power conversion components are mounted on one side confined by a C-letter cross section of its both sides. An outer housing is attached to the core frame so as to cover the core frame, and a fan supplies cooling air to a region confined by the C-letter shaped cross section of the core frame.

5 Claims, 13 Drawing Sheets

(51) Int. Cl.
  *B60L 11/18* (2006.01)
  *H02J 7/02* (2006.01)

(56) References Cited

U.S. PATENT DOCUMENTS

2007/0247110 A1* 10/2007 Kaji ............... H02J 7/0042
                                              320/107
2013/0113424 A1* 5/2013 Froelich ............ H02J 7/00
                                              320/109
2013/0309898 A1* 11/2013 Mizuno ............ H01R 13/639
                                              439/347

FOREIGN PATENT DOCUMENTS

| | | |
|---|---|---|
| JP | 2001244664 A | 9/2001 |
| JP | 2008171199 A | 7/2008 |
| JP | 2011087354 A | 4/2011 |

* cited by examiner

BATTERY CHARGER

CROSS REFERENCE TO RELATED APPLICATION

The present application claims priority to Japanese Patent Application No. 2011-223284, filed Oct. 7, 2011 and incorporated herein in its entirety.

TECHNICAL FIELD

The present invention relates to a battery charger preferably applied to charging a battery loaded on an electric vehicle or a hybrid vehicle.

BACKGROUND

There is known a battery charger comprised of an electric circuit including a power-supply system for supplying electric power to a power source battery on the interior of the back of an indicator window of its chassis and/or on the back of its operator's panel (see paragraph 0017 and FIGS. 3 and 4 of Japanese Patent Application Laid-open No. H11-266509).

SUMMARY

The interior of the chassis of the battery charger with the electric circuit of the prior art, however, has a problem of poor performance in cooling of electric devices producing heat because no regard is given to its aeration.

A problem to be solved by the present invention is to provide a battery charger with superior cooling performance for power conversion components.

The present invention solves the aforementioned problem by constituting a chassis of a battery charger so as to include a core frame formed in a C-letter shape in horizontal cross-section, wherein components at least producing heat among the power conversion components are mounted on one side confined by the concerned C-letter cross section, and an outer housing so attached to the core frame as to cover the core frame, and providing a fan supplying cooling air to a region confined by the C-letter cross section.

According to the present invention, as components producing heat are mounted on one face of a C-letter section that is effective in aeration and cooling air is supplied thereto, a battery charger with superior cooling performance for power conversion components can be provided.

BRIEF DESCRIPTION OF DRAWINGS

The description herein makes reference to the accompanying drawings wherein like reference numerals refer to like parts throughout the several views, and wherein.

DESCRIPTION OF EMBODIMENTS

<<Outline of the Charger System>>

Figure 1:
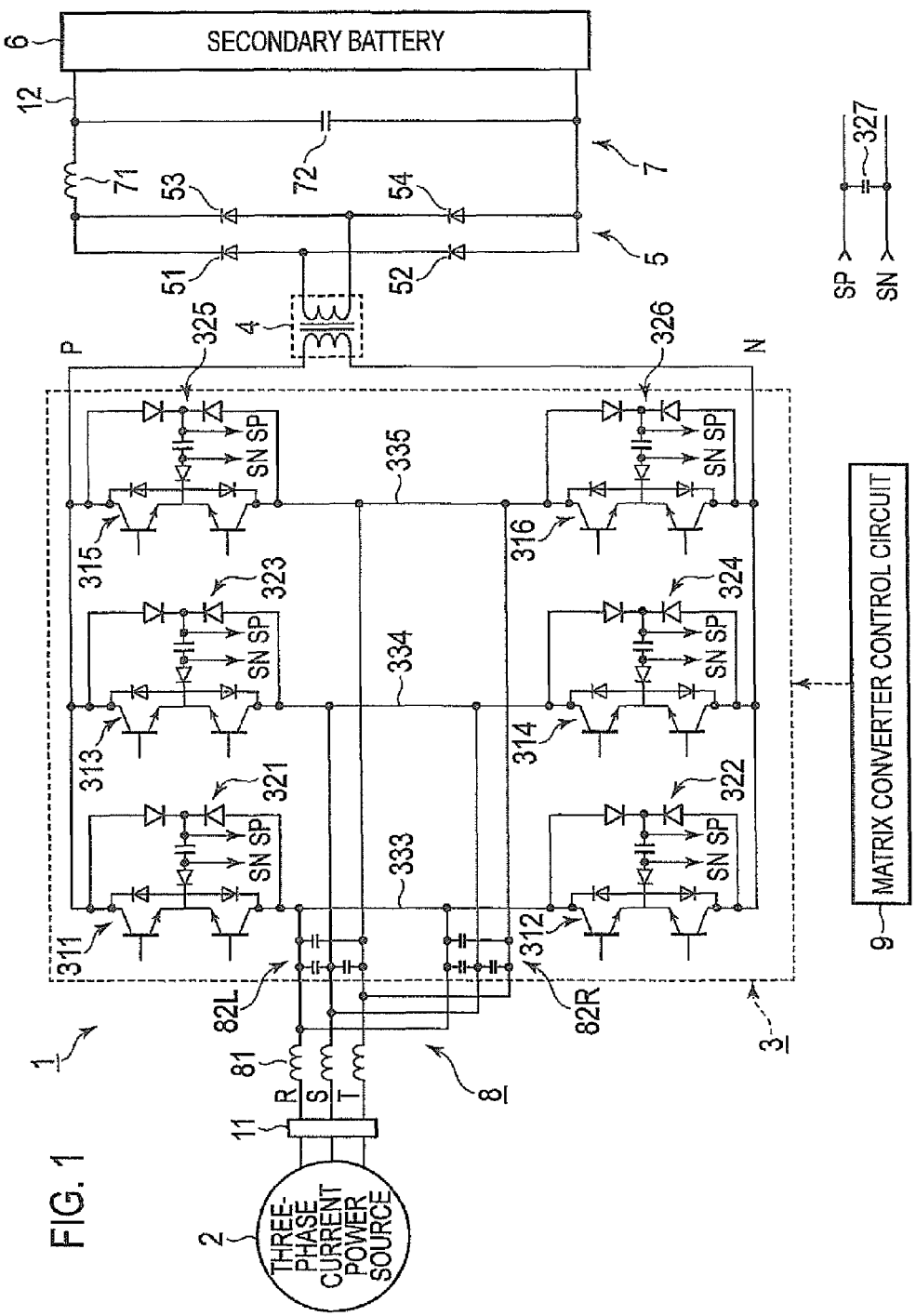
FIG. 1 is a circuit diagram depicting a charger system to which an embodiment of the present invention is applied.

An outline of a charger system to which an embodiment of the present invention is applied will be first described hereinafter with reference to FIG. 1. The charger system 1 of this example is to be applied to a case where a secondary battery 6 loaded on an electric vehicle or a hybrid vehicle is charged and is a system in which a power conversion circuit 3 directly converts three-phase current power supplied from a three-phase current power source 2 into single-phase current power which a transformer 4 properly boosts or steps down and thereafter a rectifier 5 converts the power into a direct current power to charge the secondary battery 6. In the meantime, 7 represents a smoothing circuit, 11 represents a power breaker for switching the three-phase current power source 2 on and off, and 12 represents a charging gun.

In the charger system 1 of the present example, on respective output lines corresponding to respective phases (R-phase, S-phase, T-phase) to which three-phase current power is supplied from the three-phase current power source 2, a filter circuit 8 for reducing harmonics, as a measure against noise, is provided. The filter circuit 8 of the present example is constituted of three filter reactors 81 respectively connected to the respective phases R,S,T and six filter capacitors 82L, 82R connected among the respective phases R,S,T. The filter capacitors 82L,82R are for example constituted of six filter capacitors.

In the charger system 1 of the present example, the three-phase current power is supplied via the filter circuit 8 to the power conversion circuit 3, and is there converted into single-phase current power. The power conversion circuit 3 of the present example is comprised of six bidirectional switching devices 31 (311-316) arranged in a matrix-like arrangement corresponding to the R-phase, S-phase, T-phase, and is also referred to as a matrix converter. While the reference sign 31 will be referred hereinafter when a single bidirectional switching device is collectively called, the reference signs 311-316 will be referred when a particular device selected from the six bidirectional switching devices is called.

Each of the bidirectional switching devices 31 is constituted of an IGBT module in which an IGBT as a semiconductor switching device is combined with and connected in antiparallel with a flywheel diode. In the meantime, the constitution of each bidirectional switching device 31 is not limited to what is shown in the drawings and may be of any different constitution where two reverse blocking IGBTs are connected in antiparallel for example.

To each bidirectional switching device 31, for the purpose of protecting the bidirectional switching device 31 from surge voltage generated in response to ON/OFF actions of the concerned bidirectional switching device 31, a snubber circuit 32 (321-326) is provided at its input side and its output side, in which one snubber capacitor 327 (see the circuit diagram shown at the lower right in the same drawing) and three diodes are combined. While the reference sign 321 will be referred hereinafter when a single snubber circuit is collectively called, the reference signs 321-326 will be referred when a particular snubber circuit selected from the six snubber circuits is called.

The charger system 1 of the present example is comprised of a matrix converter control circuit 9 for ON/OFF control of the respective bidirectional switching devices 31 of the power conversion circuit 3. The matrix converter control circuit 9 inputs a value of voltage supplied from the three-phase current power source 2, a value of direct current being currently output, and a target current instruction value, based thereon controls respective gate signals of the bidirectional switching devices 31, and controls single-phase current power output to the transformer 4 to obtain direct current power consistent with the target.

The transformer 4 boosts or steps down voltage of the single-phase current power converted by the power conversion circuit 3 to a predetermined value. The rectifier 5 is comprised of four rectifier diodes 51-54 for example to convert the voltage-controlled single-phase current power into direct current power. Further the smoothing circuit 7 is comprised of an inductor 71 and a capacitor 72 to smooth and bring pulsating current contained in the rectified direct current and thereby bring it into a condition closer to direct current. The charging gun 12 connects the direct current smoothed by the smoothing circuit 7 with a charging inlet of a vehicle (not shown) and therefrom supplies electric power.

By the charger system 1 of the present example as constituted in a way as described above, as shown in FIG. 2, the three-phase current power supplied from the three-phase current power source 2 is supplied via the power breaker 11 and the filter reactors 81 to the power conversion circuit 3 and is, as the matrix converter control circuit 9 controls the power conversion circuit 3, converted directly into the single-phase current power, and is further controlled up or down to a proper voltage by the transformer 4 and thereafter converted into the direct current power by the rectifier 5. Further the direct current power smoothed by the smoothing circuit 7 is supplied via the charging gun 12 to the secondary battery 6, thereby charging the secondary battery 6. Meanwhile the charger system 1 as described above is merely an example and the charger system 1A according to the present invention is not limited to the charger system 1 of the constitution as shown in the drawing.

<<Arrangement of Components of Charger Device>>

Next an arrangement and a constitution of the charger device 1A including the power breaker 11 through the charging gun 12 of FIG. 2 will be described hereinafter with reference to FIGS. 3-12. It is noted that correspondence will be shown by attaching identical reference signs to components identical to those shown in FIGS. 1 and 2.

Figure 2:
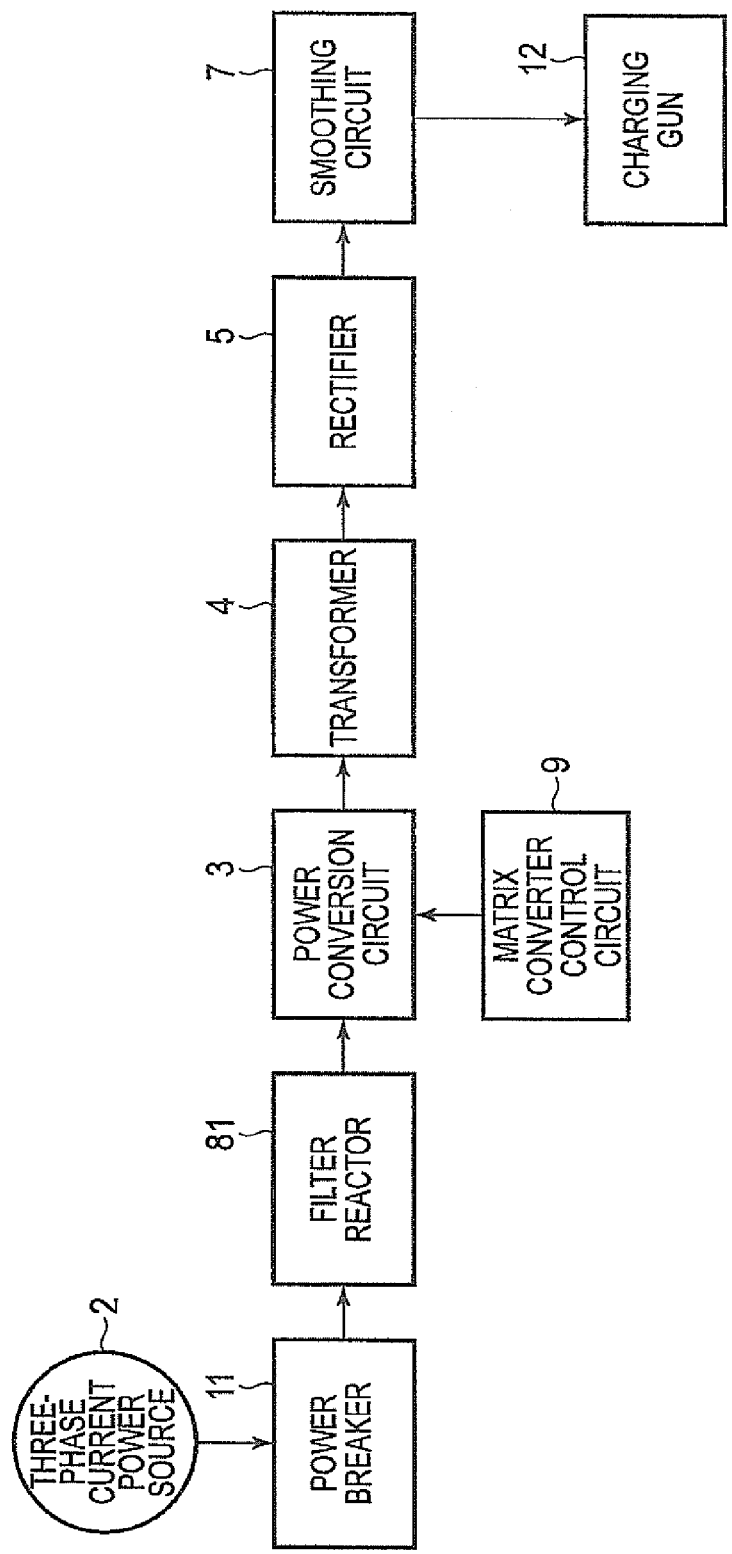
FIG. 2 is a block diagram depicting components constituting the charger device of FIG. 1 and flow of electric power therein.

The charger device 1A of the present example is so constituted that inside the chassis 13 mounted are the power breaker 11, the filter reactors 81, the power conversion circuit 3, the matrix converter control circuit 9, the transformer 4, the rectifier 5 and the smoothing circuit 7 shown in FIG. 2, and from the chassis 13 led out is the cable 12a, on a tip of which the charging gun 12 is mounted. The components mounted in the chassis 13 will be also referred to as power conversion components.

Regarding the chassis 13, its bottom portion 141 is fixed to an installation spot of the concerned charger device 1A and it is comprised of a core frame 14 on which the aforementioned power conversion components are mounted, and an outer housing 15 mounted on and pinching both sides of the core frame 14. Meanwhile, "both sides" of the core frame 14 mean the front and the back in the example shown in the drawings and it is defined that the front is where a user gets access when the charger device 1A is set and the back is opposed thereto. The essential matter in the present invention is to mount the outer housing 15 so as to pinch the core frame 14 and therefore the both sides are not limited to the front and the back and may be left and right side faces.

Figure 5:
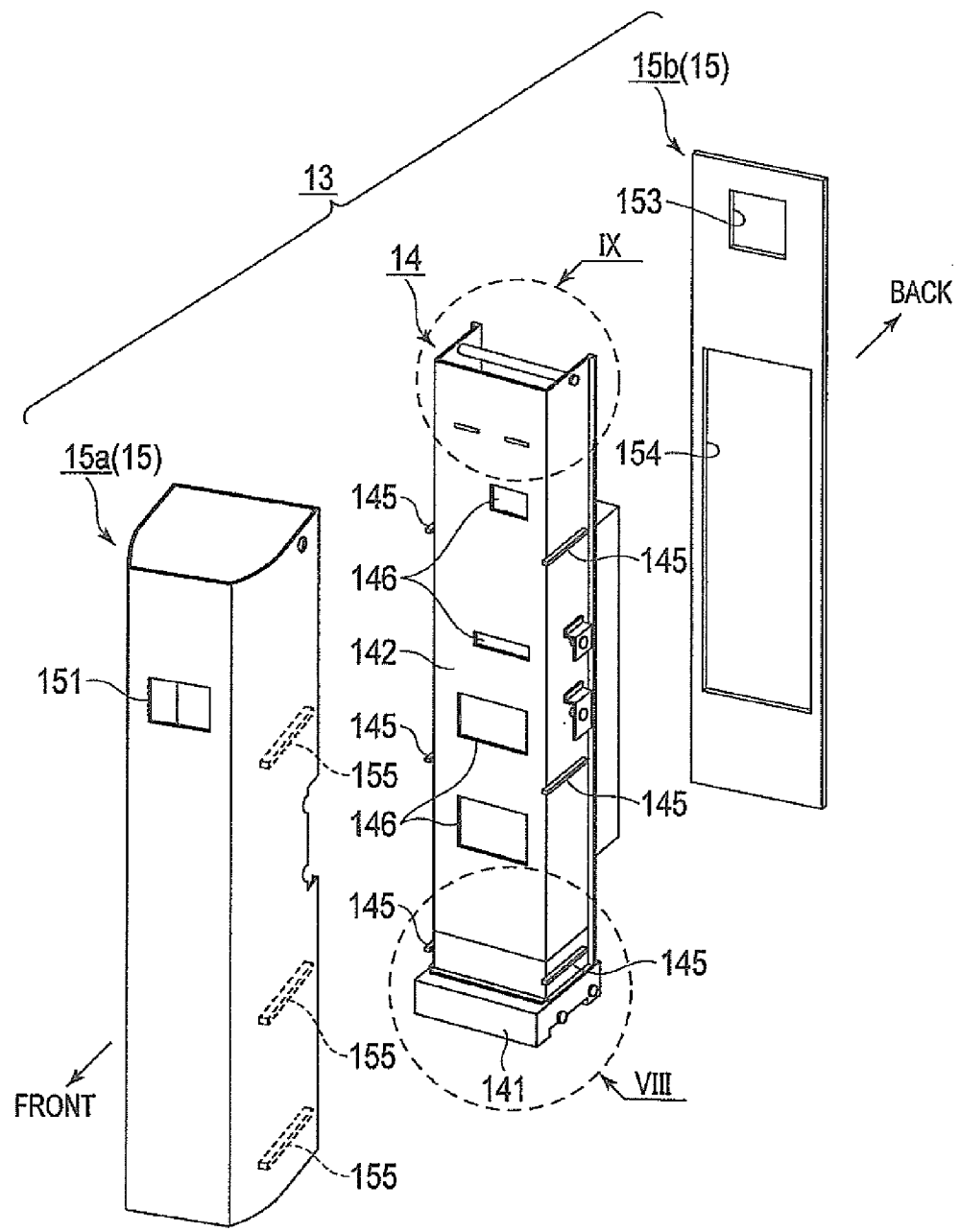
FIG. 5 is a perspective view in which the chassis of FIG. 4 is broken and shown.
Figure 6:
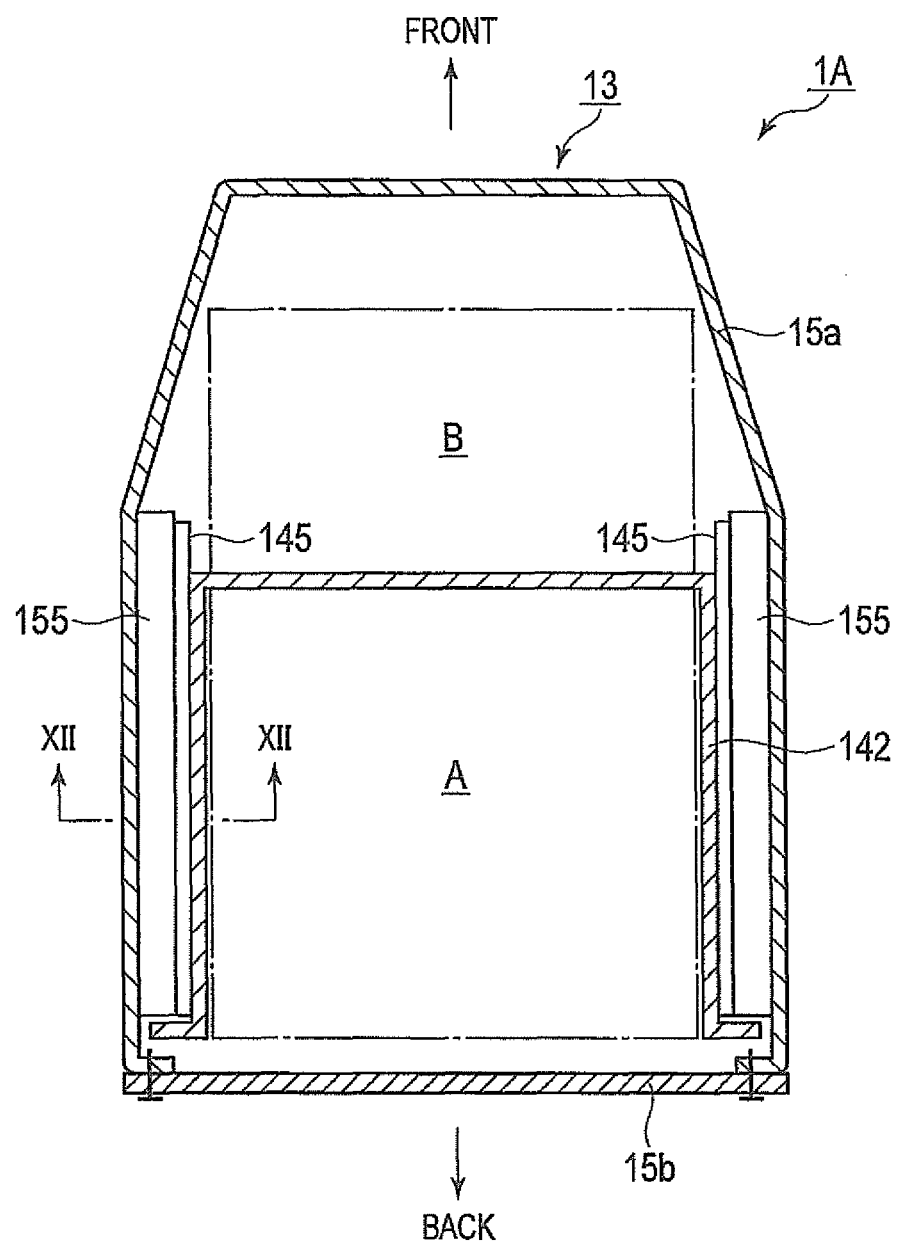
FIG. 6 is a sectional view taken along a line VI-VI of FIG. 4.
Figure 7:
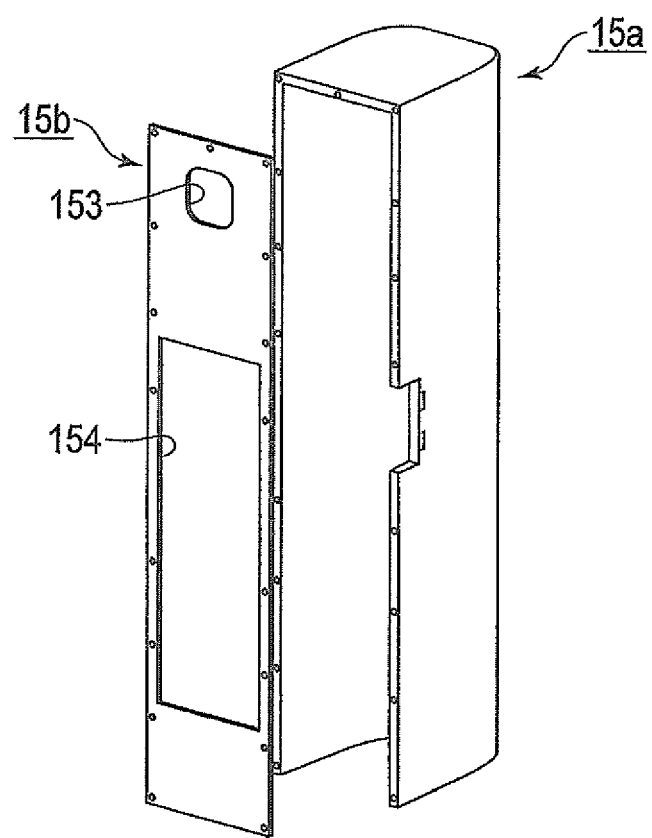
FIG. 7 is an exploded perspective view in which an outer housing of FIG. 5 is viewed from its back.

The core frame 14 includes a base plate 141 constituting the bottom portion fixed to the installation spot of the charger device 1A by means of any fixation means such as anchor bolts, and a core frame body 142 bent in a C-letter shape in horizontal cross-section, and the core frame body 142 is as shown in FIG. 5 fixed to the base plate 141. A state of the horizontal cross section of the core frame body 142 is shown in FIG. 6, the base plate 141 is shown in FIG. 8, and a top portion of the core frame body 142 is shown in FIG. 9.

Figure 8:
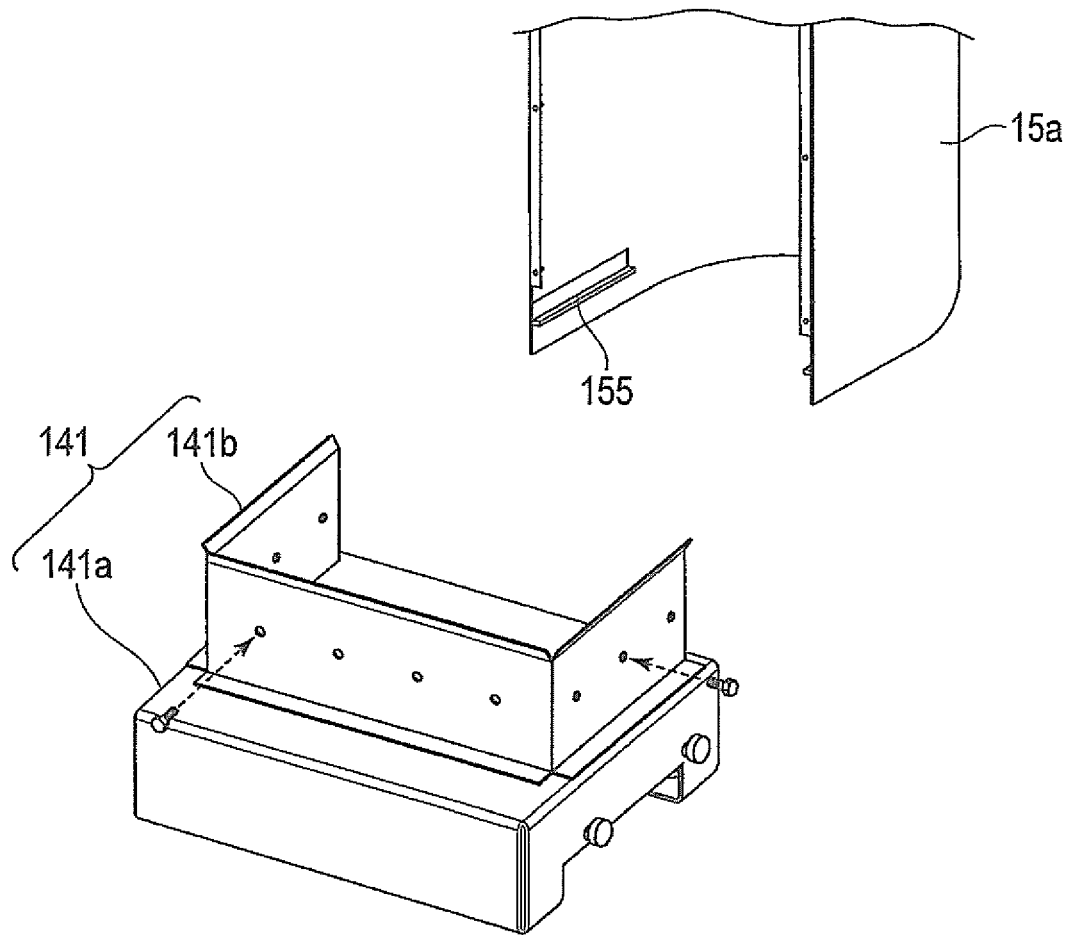
FIG. 8 is a perspective view enlarging and showing a part VIII of FIG. 5.
Figure 9:
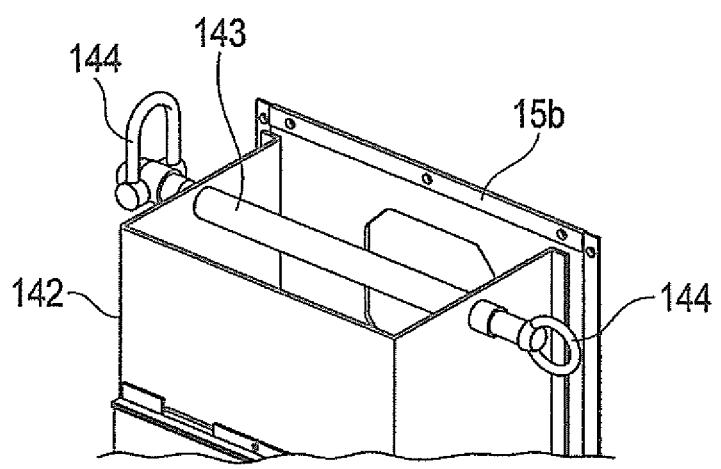
FIG. 9 is a perspective view enlarging and showing a part IX of FIG. 5.

As shown in FIG. 8, the base plate 141 includes a base plate body 141a fixed to the installation spot by means of anchor bolts or such, and a bracket 141b fixed to the base plate body 141a by means of welding, and the core frame body 142 is fixed to the bracket 141b by means of bolts or such. The core frame body 142 thereby stands upright and is securely fixed to the installation spot. In the meantime, as shown in FIG. 9, at the top portion of the core frame body 142 provided is a pipe 143 so as to penetrate it and at the both ends provided are suspension harnesses 144. As the core frame 14 with the power conversion components mounted thereon, as described later, comes to be a heavy load, the suspension harnesses 144 can be useful in work of installation by hooking it to a crane when the charger device 1A is to be transported to the installation spot.

Figure 4:
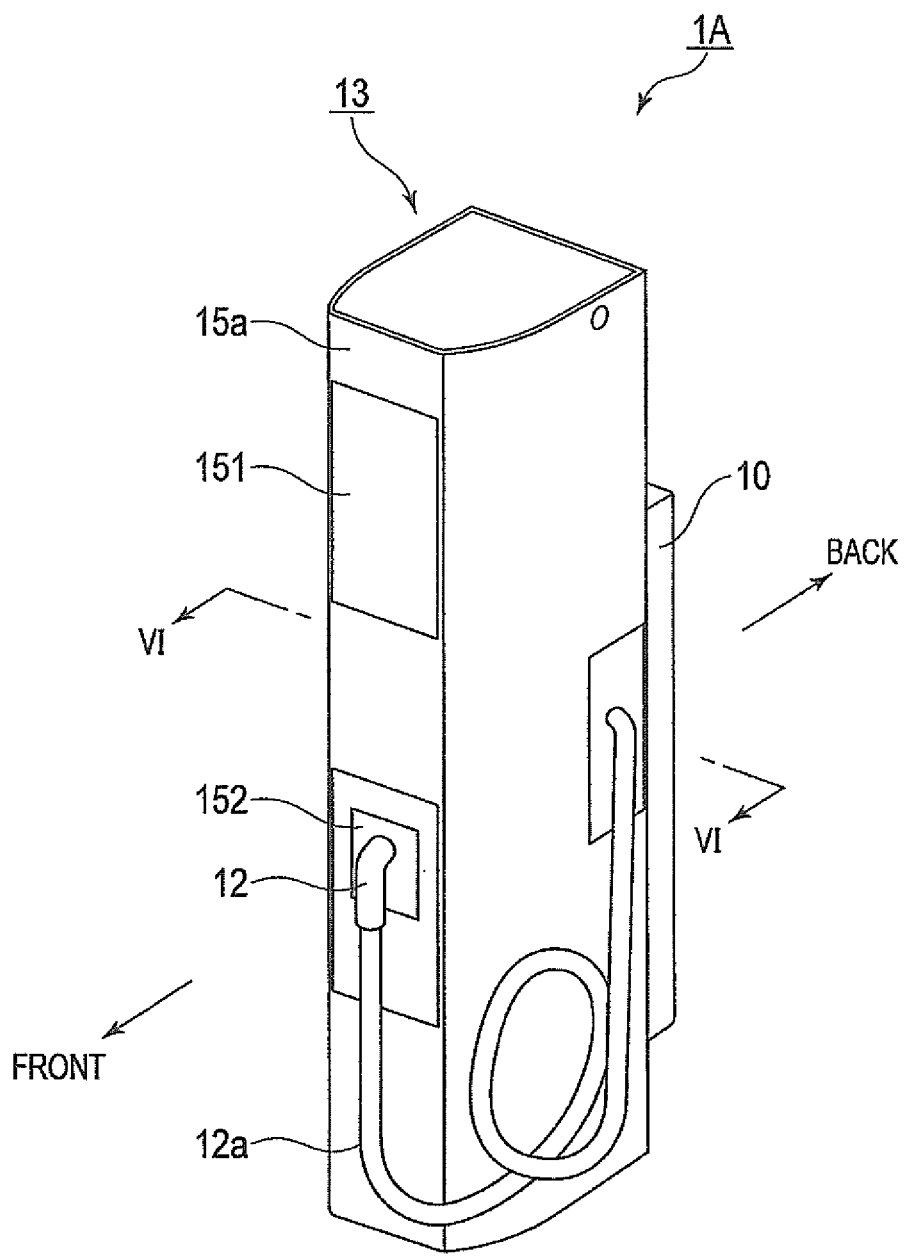
FIG. 4 is a total perspective view showing a chassis of the charger device according to the embodiment of the present invention.

Returning to FIG. 5, the outer housing 15 includes a first outer housing 15a mounted on the front of the core frame 14 and a second outer housing 15b mounted on the back of the core frame 14. As shown in the same drawing, the first outer housing 15a of the present example includes a side plate bent in a C-letter shape including a gradually curved line in cross-section and a top plate, where the side plate and the top plate are fixed together by means of welding or such. Further, as shown in FIG. 4, on the side plate at the front provided are an operator's panel 151 for receiving input of operating instructions and displaying control states for example and a gun pocket 152 for housing the charging gun 12 not in use.

The second outer housing 15b of the present example is formed in a flat plate as shown in FIG. 5 and opened thereon are a through-hole 153 in which the power conversion circuit 3 and the rectifier 5 are mounted and a through-hole 154 for exposing heat sinks mounted on the power conversion circuit 3 and the rectifier 5 out of the chassis. Further the first outer housing 15a and the second outer housing 15b are, as shown in FIG. 6, mounted on the core frame 14 by fixing these coupling portions together by bolts, screws or such as shown in FIG. 6.

In the meantime, although the first outer housing 15a is formed in a C-letter shape in cross-section and the second outer housing 15b is formed in a flat plate in this example, the outer housing 15 according to the present invention is not limited to such a shape and therefore both the components 15a,15b may be formed in a C-letter shape in cross-section.

Figure 12:
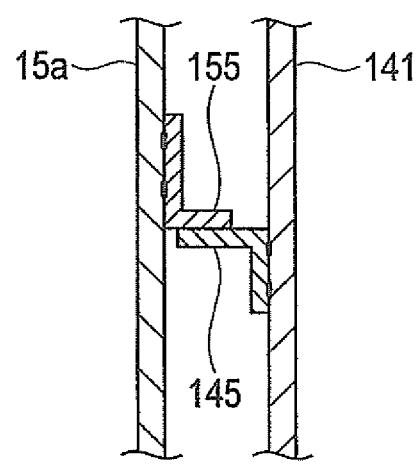
FIG. 12 is a sectional view taken along a line XII-XII of FIG. 6.

The outer housing 15a is mounted on the core frame body 142 in such a way as to be slidable by means of a rail structure. More specifically, as shown in FIG. 5, on both sides of the core frame body 142, at three spots thereof as being vertically apart, L-shape angle irons 145 are fixed, while on both internal sides of the first outer housing 15a, likewise at three spots thereof as being vertically apart, L-shape angle irons 155 are fixed. These L-shape angle irons 145 of the core frame and the L-shape angle irons 155 of the first outer housing mate together as shown in FIG. 12. The first outer housing 15a is thereby made slidable forward and rearward relative to the core frame body 142, thereby improving productivity in installation or un-installation of the first outer housing 15a.

In the meantime, as the pipe 143 to which suspension harnesses 144 are mounted as described above is provided so as to penetrate the first outer housing 15a and the core frame body 142, the outer housing 15 and the core frame body 142 are thereby fixed together in both the vertical direction and the fore-and-aft direction. On the other hand, when the pipe 143 is detached and the bolts or such fixing the first outer housing 15a with the second outer housing 15b are detached, the first outer housing 15a or the second outer housing 15b is readily detached from the core frame body 142.

Figure 3:
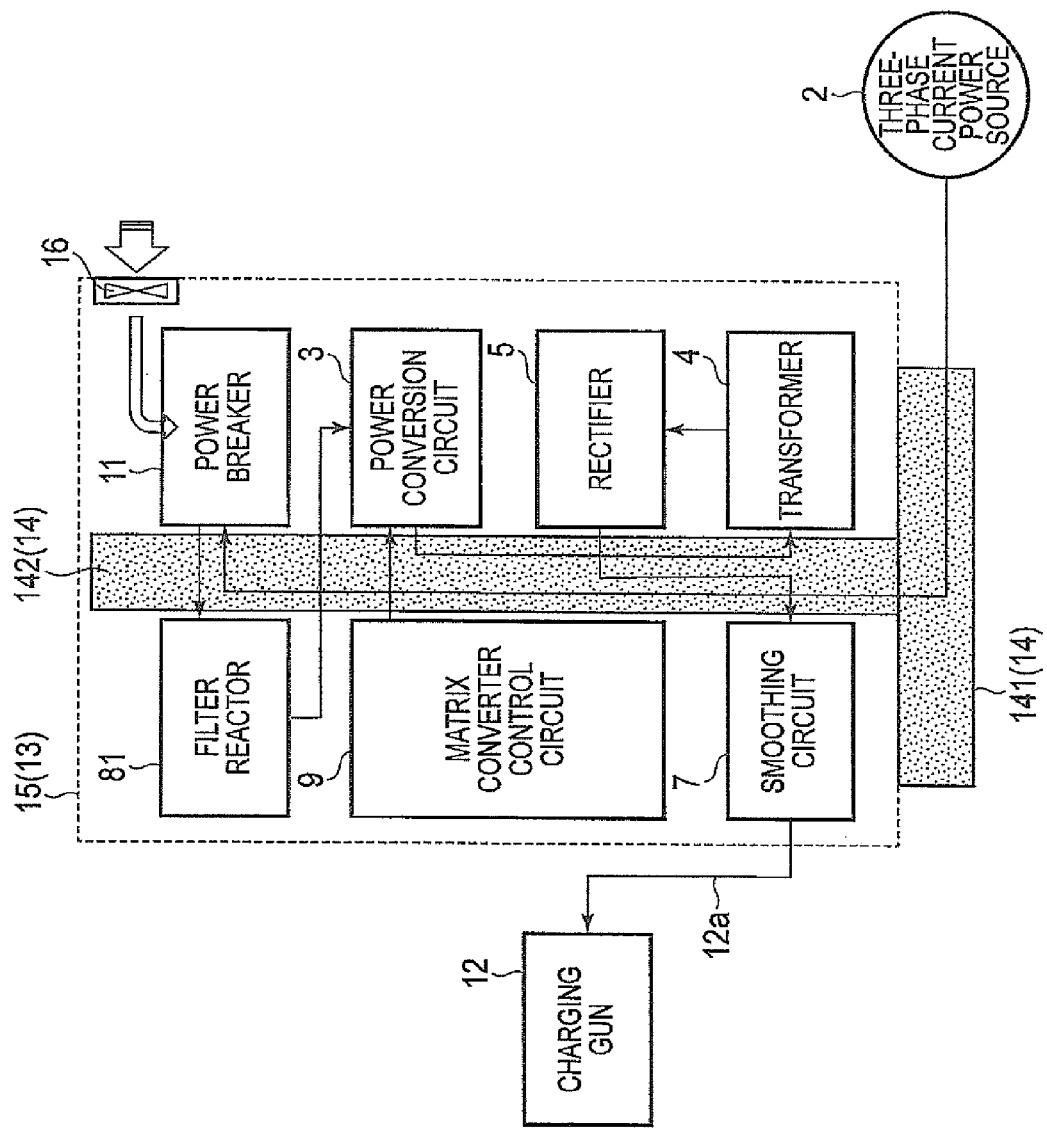
FIG. 3 is a drawing showing a mounting structure of a power conversion device constituting the charger device of FIG. 2 onto a core frame.

Next, descriptions about the power conversion components mounted on the core frame body 142 will be given hereinafter. FIG. 3 shows a mounting structure in a vertical cross section of the power conversion components on the core frame body 142, FIG. 6 likewise shows the mounting structure of the power conversion components on the core frame body 142 in a horizontal cross section, and FIG. 11A and FIG. 11B show a mounting state of all the components.

As shown in FIG. 6 in horizontal cross-section, two rooms A,B lie inside the chassis 13, which are partitioned by the core frame body 142. More specifically, they are two rooms of the room A confined by the C-letter cross section of the core frame body 142 and the room B at the back thereof. In this example, components producing heat are, when mounted in the core frame body 142, mounted in the room A confined by the C-letter cross section. More specifically, as components producing heat among the power conversion components shown in FIG. 2 are the power conversion circuit 3, the rectifier 5 and the transformer 4, they are mounted at the side of the room A. A fan 16 is at the same time mounted in the through-hole 153 opened on the second outer housing 15b shown in FIG. 5 so as to, as shown in FIG. 3, suck and introduce cooling air into the room.

On the other hand, while the rest of the components of FIG. 2 can be mounted in the remaining space in the rooms A,B, these components are laid out to run along flow of the electric power as far as possible when they are mounted in the core frame body 142. More specifically, if the power breaker 11, the filter reactors 81, the power conversion circuit 3, the matrix converter control circuit 9, the transformer 4, the rectifier 5 and the smoothing circuit 7 can be arranged in this order, imbalance among the respective phases originated from inductances among lines and noises will be suppressed, thereby improving power conversion efficiency.

Figure 11A:
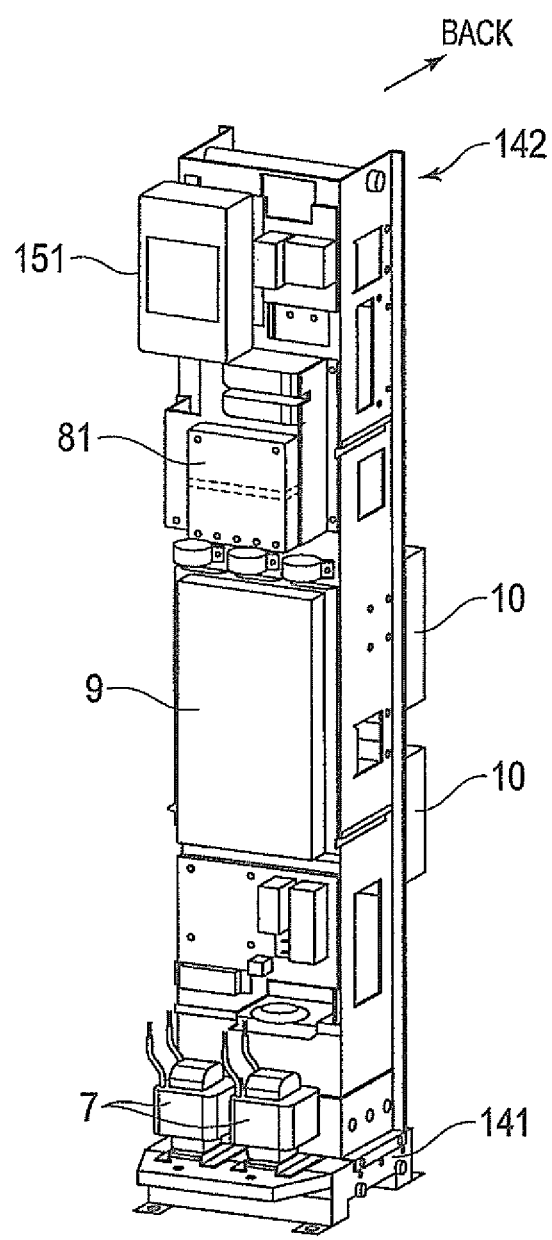
FIG. 11A is a perspective view showing a state where the power conversion device is mounted on the core frame of FIG. 5, which is viewed from the front.
Figure 11B:
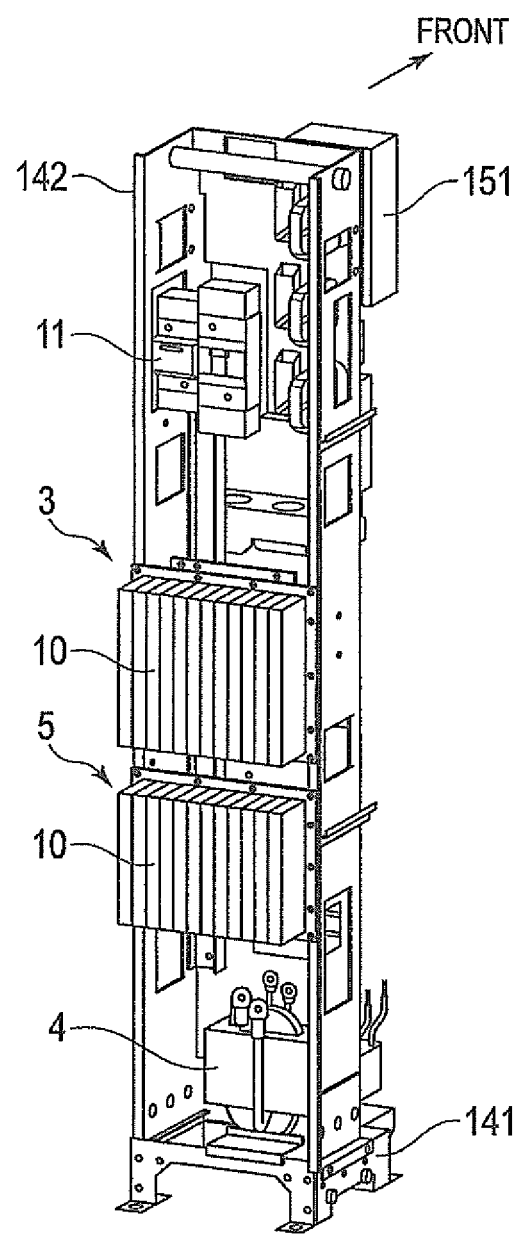
FIG. 11B is a perspective view showing the state where power conversion device is mounted on the core frame of FIG. 5, which is viewed from the back.

Thus in this example, they are placed in a layout as shown in FIG. 3 and FIGS. 11A,11B. In brief, the three-phase current power source 2 such as a commercial power source is introduced through the base plate 141 of the core frame 14 and connected with the power breaker 11 mounted at the uppermost portion of the room A. Cables from the power breaker 11 are inserted through through-holes 146 (see FIG. 5) opened on the core frame body 142 and connected with the filter reactors 81 mounted at the uppermost portion of the room B.

Cables from the filter reactors 81 are similarly inserted through the through-holes 146 opened on the core frame body 142 and then connected with the power conversion circuit 3 mounted at the next stage to the room A. At the room B at the back of the power conversion circuit 3, the matrix converter control circuit 9 is mounted, and control cables from the matrix converter control circuit 9 are inserted through the through-holes 146 opened on the core frame body 142 and connected with the power conversion circuit 3.

Normally, the transformer 4 is preferably mounted at the next to the power conversion circuit in the room A. As the transformer 4 is however a heavy load and thus stability of the charger device 1A is thought much of, the transformer 4 is mounted at the lowermost portion of the room A. Cables from the power conversion circuit 3 are accordingly connected with the transformer 4 at the lowermost portion of the room A and cables from the transformer 4 are connected with the rectifier 5 mounted at the next to the power conversion circuit 3 in the room A. And, cables from the rectifier 5 are inserted through the through-holes 146 opened on the core frame 142 and connected with the smoothing circuit 7 mounted at the lowermost portion of the room B. Meanwhile the cable 12a, on the tip of which the charging gun 12 is mounted, is led out through a proper spot of the first outer housing 15a to the exterior. FIG. 11A shows a mounting state of the components with the core frame body 142 viewed from the front and FIG. 11B shows the same from the back.

Figure 10:
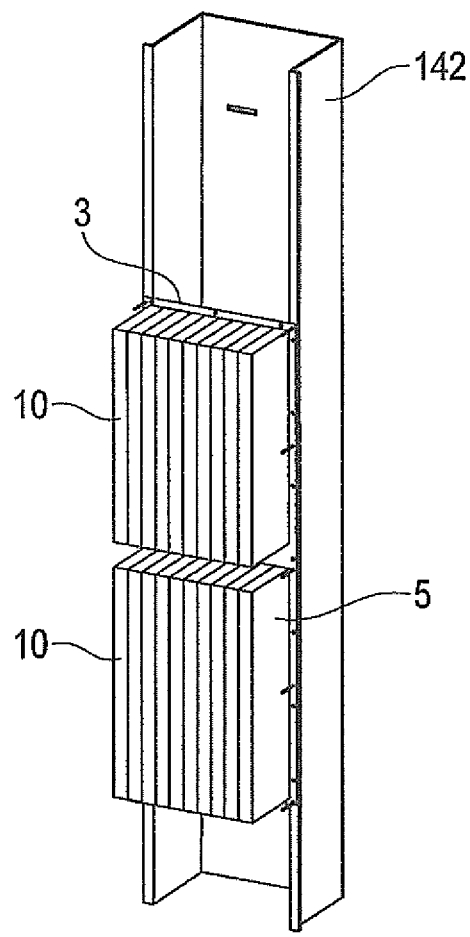
FIG. 10 is a perspective view showing a state where heat sinks are mounted on the core frame of FIG. 5.

FIG. 10 shows a state where the heat sinks 10 mounted with the power conversion circuit 3 and the rectifier 5 are mounted on the flange of the core frame body 142. On the backs of the heat sinks 10, the power conversion circuit 3 and the rectifier 5 are mounted. As the heat sinks 10 are fixed with the flange of the core frame body 142 and thereby the heat sinks 10 with high rigidity come to be a structure constituting the core frame body 142, rigidity of the core frame body 142 of itself is improved.

The aforementioned embodiment produces the following effects.

1) In this example, because the chassis 13 of the charger device 1A is constituted of a core frame body 142, in which the base plate 141 at its bottom portion is fixed to the installation spot and the power conversion components are mounted thereon, and the outer housings 15a,15b detachably attached to the concerned core frame body 142 so as to pinch both sides thereof, when the first outer housing 15a is detached from the core frame body 142, the filter reactors 81, one can make the matrix converter control circuit 9 or the smoothing circuit 7, any of which are mounted in the room B, ready for maintenance or inspection as shown in FIG. 11A. Further, when the second outer housing 15b is detached from the core frame body 142, one can make the power breaker 11, the power conversion circuit 3, the rectifier 5 or the transformer 4, any of which are mounted in the room A, ready for maintenance or inspection as shown in FIG. 11B. The charger device 1A of this example is in this way superior in workability of maintenance or inspection, improves freedom of design in regard to the outer housing 15, and can make the charger device 1A of itself compact.

2) In this example, because the first outer housing 15 and the core frame body 142 are so constituted as to be slidable by means of engagement of the L-shape angle irons 145,155, productivity of assembly including positioning the first outer housing 15a relative to the core frame body 142 at a time of detaching and attaching is prominently improved.

3) In this example, because the core frame body 142 is formed in a C-letter shape in horizontal cross-section and the power conversion components are mounted on both sides thereof, its cumulation ratio increases and in addition lengths of the cables connecting the components can be shortened.

4) In this example, because the through-holes 146 are opened on the core frame body 142 and the cables connecting the power conversion components are inserted therethrough, the lengths of the cables can be further shortened.

5) In this example, the core frame body 142 is formed in a C-letter shape in cross-section, in the room A confined by the C-letter cross section, the power conversion circuit 3, the transfer 4 and the rectifier 5 producing heat are mounted, and cooling air is made to be introduced into the room A by means of the fan 16. Although it is possible without any means to prevent heated air from staying there as the room A is confined by the C-letter cross section, in this example, as the fan 16 is provided, air introduced from the uppermost portion of the room A as shown in FIG. 3 flows down without diffusion through the room A confined by the C-letter cross section of the core frame body 142 toward the lower portion. It can thereby cool the components producing heat. Further, because the heat sinks 10 are provided on the power conversion circuit 3 and the rectifier 5 particularly producing considerable heat and the heat sinks 10 are exposed out of the exterior through the through-hole 154 of the second outer housing 15*b*, efficiency of cooling is further improved.

6) In this example, because the power breaker 11, the power conversion circuit 3, the rectifier 5 and the transformer 4 are arranged in this order, the lengths of the cables among the power conversion components are made as equal as possible, flows of the respective powers in a theoretical circuit of the charger device 1A shown in FIG. 2 and a real circuit shown in FIG. 3 are made substantially equal. As a result, efficiency of power conversion can be improved.

The power breaker, the filter reactors 81, the power conversion circuit 3, the matrix converter control circuit 9, the transformer 4, the rectifier 5 and the smoothing circuit 7 as described above are corresponding to the power conversion components in the present invention, the L-shape angle irons 145,155 are corresponding to a rail structure of the present invention, the transformer 4 is corresponding to a voltage conversion circuit of the present invention, and the rectifier is corresponding to a rectifying circuit of the present invention.

The invention claimed is:

1. A battery charger comprising:
   a core frame formed in a C-letter shape in horizontal cross-section and fixed to an installation site;
   power conversion components configured to convert commercial power into direct current power, the power conversion components being mounted respectively on both sides of the core frame;
   an outer housing including a first housing covering the power conversion components from a direction opposite an opening portion of the C-letter shape of the core frame and a second housing covering the opening portion of the C-letter shape of the core frame and detachably supported by the core frame; and
   a fan supplying cooling air to a region confined by the C-letter shape of the core frame,
   wherein an interior of the outer housing is surrounded by the core frame and the second housing, forming one space separated from another space in the interior,
   wherein components at least producing heat among the power conversion components are mounted in the one space of the interior and the other components of the power conversion components are mounted in the other space of the interior, and
   wherein cooling air is supplied by the fan to the one space.

2. The battery charger of claim 1, wherein the power conversion components include a power breaker, a filter circuit, a power conversion circuit, a voltage conversion circuit, a rectifier circuit, a smoothing circuit and a power conversion circuit control circuit, and
   the components producing heat include the power conversion circuit, the voltage conversion circuit and the rectifier circuit.

3. The battery charger of claim 2, wherein the power breaker, the filter circuit, the smoothing circuit and the power conversion circuit control circuit are mounted in the other space of the interior.

4. The battery charger of claim 2, wherein a heat sink is provided on the power conversion circuit and the rectifier circuit, and
   the heat sink is so provided as to expose to an exterior through a through-hole formed on the second housing.

5. The battery charger of claim 4, wherein the heat sink is fixed to the opening portion of the C-letter shape of the core frame.

\* \* \* \* \*